United States Patent
Suganuma et al.

(10) Patent No.: US 9,126,530 B2
(45) Date of Patent: Sep. 8, 2015

(54) LIGHTING DEVICE, HEADLIGHT APPARATUS USING THE SAME, AND VEHICLE USING THE SAME

(71) Applicant: Panasonic Corporation, Osaka (JP)

(72) Inventors: Kazutoshi Suganuma, Niigata (JP);
Toshifumi Tanaka, Osaka (JP);
Takahiro Fukui, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/478,415

(22) Filed: Sep. 5, 2014

(65) Prior Publication Data
US 2015/0069909 A1    Mar. 12, 2015

(30) Foreign Application Priority Data
Sep. 10, 2013  (JP) .................. 2013-187583

(51) Int. Cl.
*B60Q 1/02* (2006.01)
*B60Q 1/14* (2006.01)
*B60Q 1/04* (2006.01)
*H05B 33/08* (2006.01)

(52) U.S. Cl.
CPC .............. *B60Q 1/1423* (2013.01); *B60Q 1/04* (2013.01); *H05B 33/083* (2013.01); *H05B 33/089* (2013.01); *H05B 33/0815* (2013.01)

(58) Field of Classification Search
CPC ............. B60Q 1/1423; B60Q 2300/05; H05B 33/083; H05B 33/0815
USPC ............ 315/307, 82, 185 R, 186, 193, 209 R, 315/210, 212, 219, 313
See application file for complete search history.

(56) References Cited

U.S. PATENT DOCUMENTS

| 7,081,708 B2 * | 7/2006 | Ito et al. .................. 315/82 |
| 2004/0075393 A1 | 4/2004 | Ito et al. |
| 2011/0260617 A1 * | 10/2011 | Tanaka ..................... 315/82 |
| 2013/0049586 A1 | 2/2013 | Hamana et al. |
| 2013/0320850 A1 * | 12/2013 | Nakamura ................. 315/82 |

FOREIGN PATENT DOCUMENTS

| JP | 2004-136719 A | 5/2004 |
| JP | 2010-143447 A | 7/2010 |
| JP | 2011-113643 A | 6/2011 |
| JP | 2011-233264 A | 11/2011 |
| JP | 2013-045518 A | 3/2013 |

* cited by examiner

*Primary Examiner* — Tuyet Vo
*Assistant Examiner* — Borna Alaeddini
(74) *Attorney, Agent, or Firm* — Renner, Otto, Boisselle & Sklar, LLP

(57) ABSTRACT

A microcomputer is configured to perform a first control and a second control. The first control is of: starting operation of a power converter, when a first power supply voltage exceeds a starting voltage; and stopping the operation of the power converter, when the first power supply voltage is below a maintaining voltage. The second control is of: switching off a second switching element, when a second power supply voltage exceeds a first threshold voltage; maintaining an off-state of the second switching element until the second power supply voltage is below a second threshold voltage; and switching on the second switching element, when the second power supply voltage is below the second threshold voltage.

11 Claims, 12 Drawing Sheets

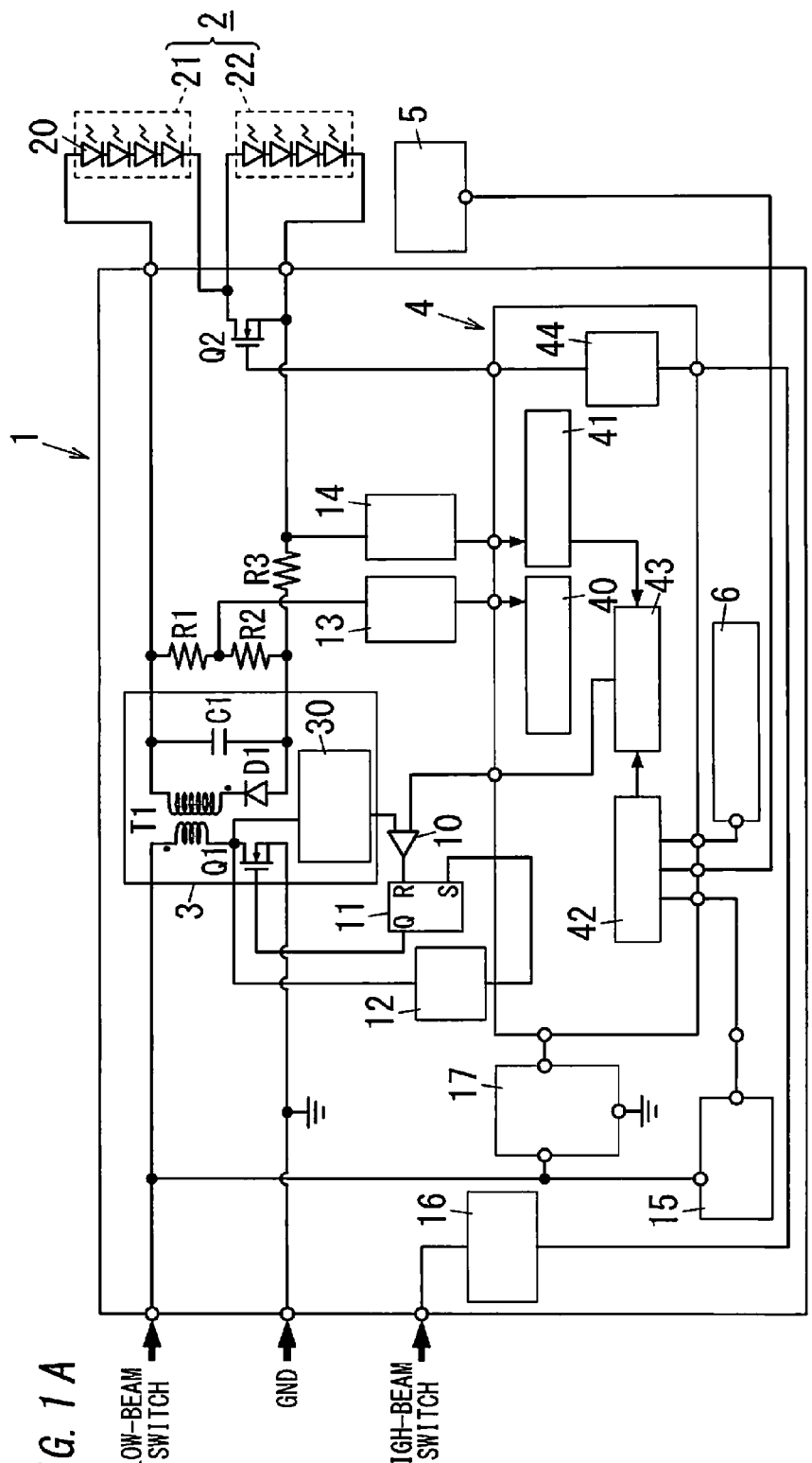
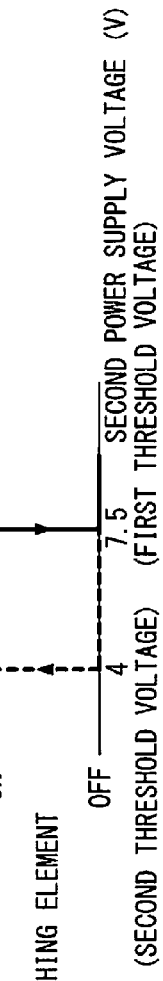
FIG. 1A
FIG. 1B

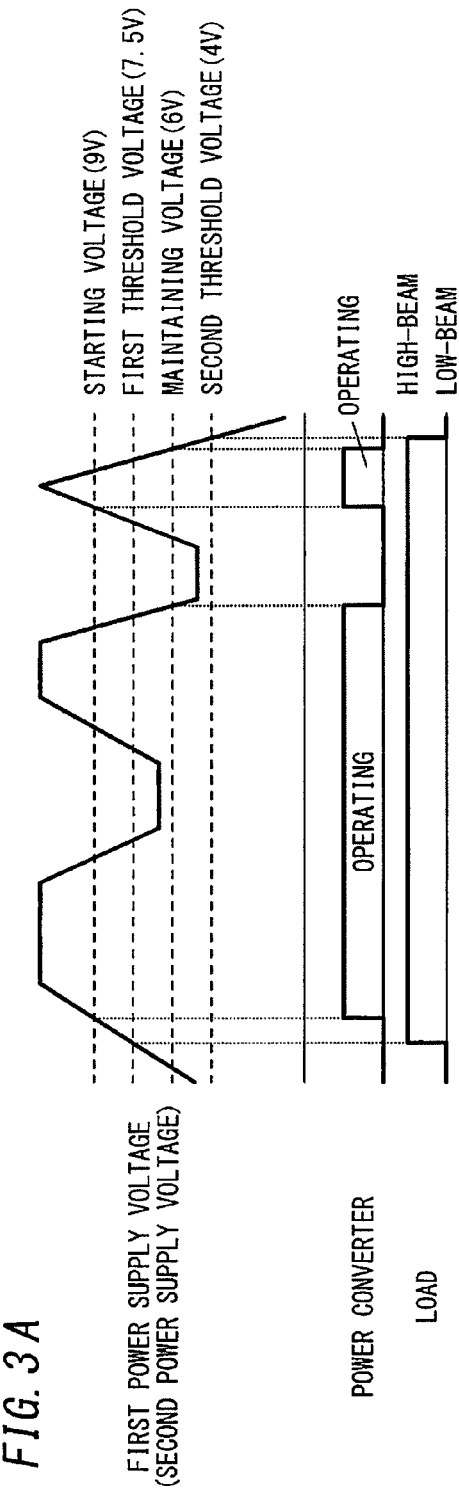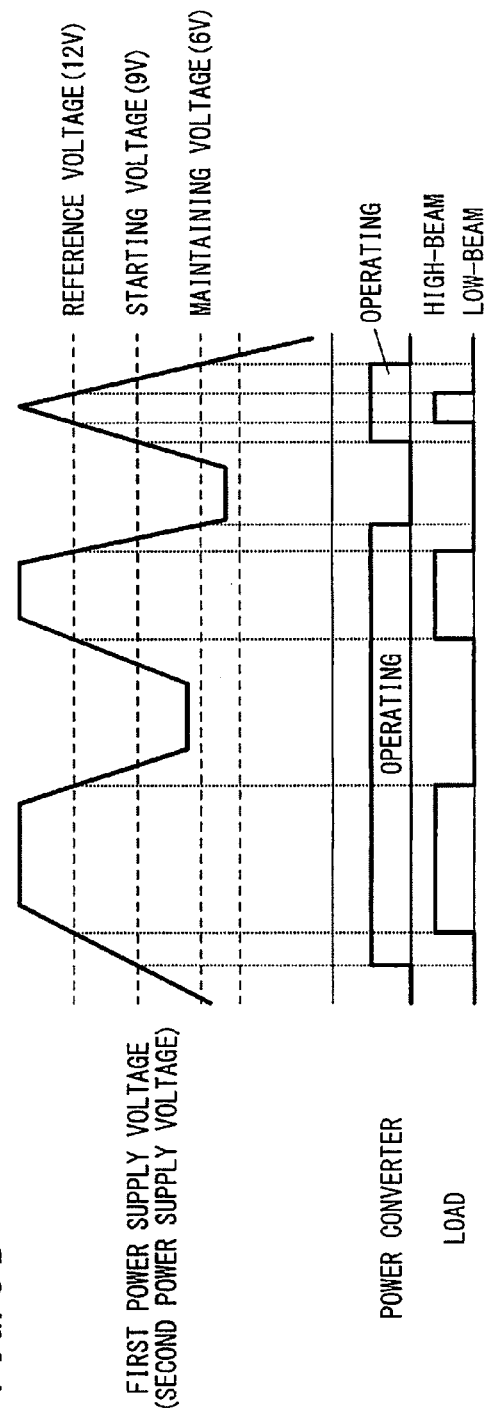

LIGHTING DEVICE, HEADLIGHT APPARATUS USING THE SAME, AND VEHICLE USING THE SAME

CROSS-REFERENCE TO RELATED APPLICATIONS

The application is based upon and claims the benefit of priority of Japanese Patent Application No. 2013-187583 filed on Sep. 10, 2013, the entire contents of which are incorporated herein by reference.

TECHNICAL FIELD

The disclosure relates generally to lighting devices, headlight apparatuses using the same, and vehicles using the same, and more particularly, to a lighting device which is configured to light a light source that includes a light emitting element such as a light emitting diode, a headlight apparatus using the same, and a vehicle using the same.

BACKGROUND ART

Conventionally, the number of vehicles including, as a headlight, an HID (High Intensity Discharged) lamp instead of a halogen lamp had been increased, in order to improve the visibility (brightness). However, recently, due to the improvement of luminous efficiency of an LED (light emitting diode), mass production of vehicles including, as the headlight, the LED has been already started. For example, JP2010-143447A (hereinafter, referred to as "document 1") discloses a lighting device for vehicle including an LED as a headlight.

The lighting device for vehicle in the document 1 includes a first light source unit including a plurality of LEDs, a second light source unit including a plurality of LEDs, and a current-driving unit (DC/DC converter) configured to supply a drive current to each LED. Further, this lighting device for vehicle includes a switching unit (bypass unit), which is connected in parallel with the plurality of LEDs of the second light source unit, and the drive current is supplied to the plurality of LEDs of the second light source unit through off-operation of the switching unit. Further, this lighting device for vehicle includes a controller, which is configured to output a bypass control signal for controlling on/off operation of the switching unit.

This lighting device for vehicle further includes a relay for a low-beam, which is connected between the controller and a vehicle battery, and configured to conduct when a low-beam lamp (the first light source unit) is made lighted. This lighting device for vehicle further includes a relay for a high-beam, which is configured to output, to the controller, a bypass instruction signal for making the switching unit perform the off-operation when a high-beam lamp (the first and second light source units) is made lighted.

Here, in the lighting device for vehicle as the above conventional example, the vehicle battery is used as a power supply. However, a power supply voltage of the vehicle battery fluctuates depending on deterioration of the vehicle battery due to the life thereof, or an increase of consumed current. Furthermore, in the lighting device for vehicle as the above conventional example, a magnitude of the power supply voltage is generally set so as to agree with a condition upon lighting and non-lighting of each beam lamp in order to light the low-beam lamp and high-beam lamp at sufficient illumination. For this reason, in the lighting device for vehicle as the above conventional example, when the power supply voltage of the vehicle battery fluctuates, there is a possibility that it is impossible to normally switch the low-beam and the high beam, namely, lighting states of a load.

SUMMARY

It is an object of the present technology to provide a lighting device, which can normally switch lighting states of a load even when a power supply voltage fluctuates, a headlight apparatus using the same, and a vehicle using the same.

A lighting device according to an aspect of the present invention includes a power converter, a bypass unit and a controller. The power converter is configured to convert a first power supply voltage that is received from a DC power supply through a first path, and supply an output obtained by the conversion to a load in which a plurality of light emitting elements are connected in series. The bypass unit is configured to short-circuit at least one light emitting element of the plurality of light emitting elements, as part of the load. The controller is configured to control the power converter. The controller is configured to control switching a first state where the at least one light emitting element is short-circuited by the bypass unit, and a second state where the short-circuiting is opened. The controller is configured to perform a first control and a second control. The first control is of starting operation of the power converter, when the first power supply voltage exceeds a starting voltage; and stopping the operation of the power converter, when the first power supply voltage is below a maintaining voltage that is lower than the starting voltage. The second control is of switching to the second state, when a second power supply voltage that is input from the DC power supply through a second path different from the first path exceeds a first threshold voltage that is lower than the starting voltage; maintaining the second state until the second power supply voltage is below a second threshold voltage that is lower than the first threshold voltage; and switching to the first state, when the second power supply voltage is below the second threshold voltage.

A headlight apparatus according to an aspect of the present invention includes the above-mentioned lighting device, the load, and a housing that houses the load.

A vehicle according to an aspect of the present invention includes the above-mentioned headlight apparatus, and a vehicle body to which the headlight apparatus is installed.

According to the present technology, as a condition of switching to the first state where the at least one light emitting element is short-circuited by the bypass unit or the second state where the short-circuiting is opened, the controller is configured to have hysteresis characteristics with the first threshold voltage and the second threshold voltage to be compared with the second power supply voltage. Further, according to the present technology, as a condition of starting the operation of the power converter, the starting voltage to be compared with the first power supply voltage is set to be lower than the first threshold voltage. Therefore, it is possible to normally switch lighting states of the load even when the power supply voltage fluctuates.

BRIEF DESCRIPTION OF THE DRAWINGS

The figures depict one or more implementations in accordance with the present teaching, by way of example only, not by way of limitations. In the figures, like reference numerals refer to the same or similar elements.

FIG. 1A is a circuit schematic diagram illustrating a lighting device according to First Embodiment;

FIG. 1B is a diagram illustrating on/off switching of a second switching element in the lighting device according to the First Embodiment;

FIG. 3A is a time chart illustrating operation of the lighting device according to the First Embodiment;

FIG. 3B is a time chart illustrating operation of a lighting device that is a comparison example;

DETAILED DESCRIPTION (First Embodiment)

Figure 2:
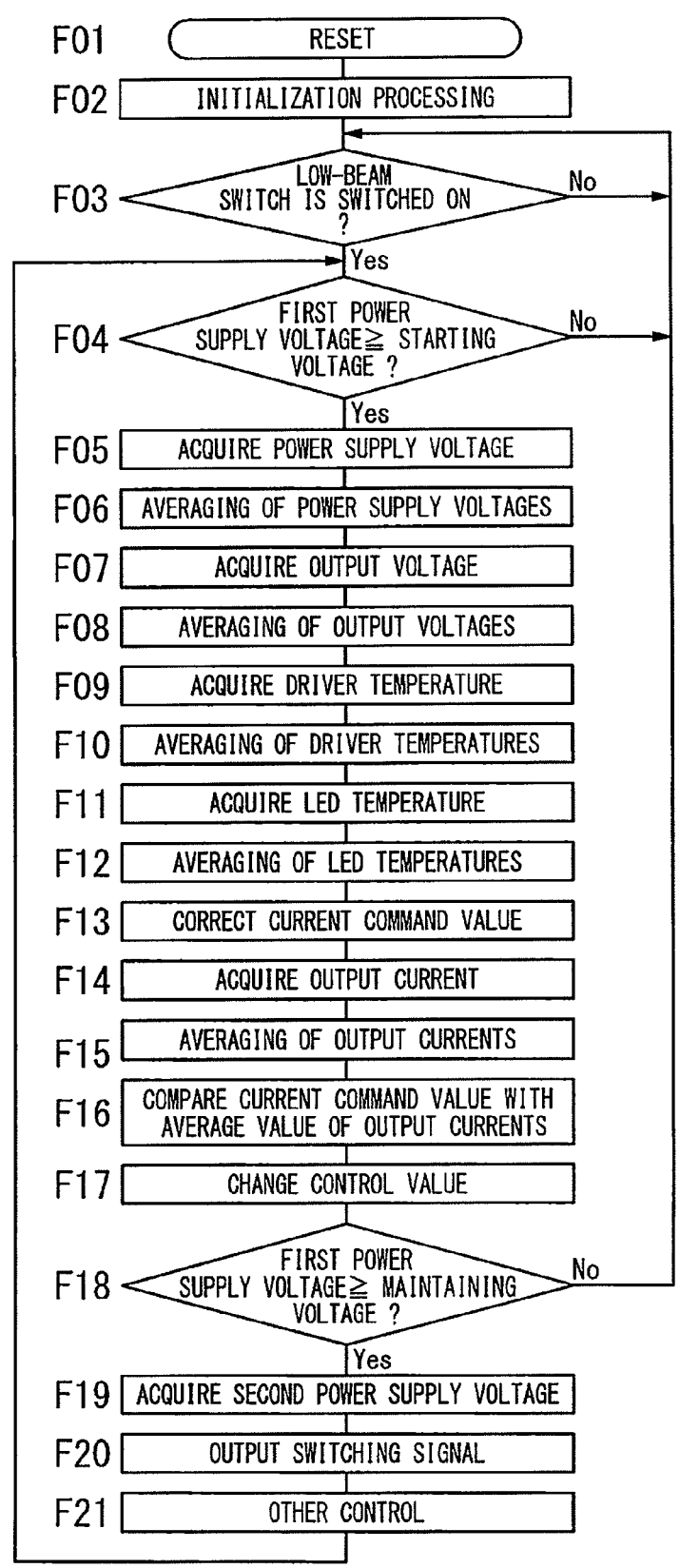
FIG. 2 is a flow chart for lighting control of a microcomputer in the lighting device according to the First Embodiment.

A lighting device 1 according to the present embodiment includes a power converter 3, a second switching element Q2 (a bypass unit) and a microcomputer 4 (a controller). The power converter 3 is configured to convert a first power supply voltage that is received from a battery 8 (a DC power supply) through a first path 50 (see FIG. 13), and supply an output obtained by the conversion to a load 2 in which a plurality of LEDs 20 (light emitting elements) are connected in series. The second switching element Q2 is configured to short-circuit at least one LED 20 (a second light source unit 22) of the plurality of LEDs 20, as part of the load 2. The microcomputer 4 is configured to control the power converter 3. Further, the microcomputer 4 is configured to control switching on/off of the second switching element Q2 (a first state where the second light source unit 22 is short-circuited by the second switching element Q2, and a second state where the short-circuiting is opened).

The microcomputer 4 is configured to perform a first control being of: starting operation of the power converter 3, when the first power supply voltage exceeds a starting voltage; and stopping the operation of the power converter 3, when the first power supply voltage is below a maintaining voltage that is lower than the starting voltage. Further, the microcomputer 4 is configured to perform a second control being of: switching off the second switching element Q2 (switching to the second state), when a second power supply voltage exceeds a first threshold voltage; and maintaining an off-state of the second switching element Q2 (the second state) until the second power supply voltage is below a second threshold voltage. Further, in the second control, the microcomputer 4 is configured to switch on the second switching element Q2 (switch to the first state), when the second power supply voltage is below the second threshold voltage. Here, the second power supply voltage is input from the battery 8 through a second path 51 (see FIG. 13) different from the first path 50. The first threshold voltage is lower than the starting voltage, and the second threshold voltage is lower than the first threshold voltage.

Hereinafter, the lighting device 1 according to the present embodiment will be specifically described with reference to drawings. As shown in FIG. 1A, the lighting device 1 according to the present embodiment is configured to light the load 2, in which the plurality of LEDs (light emitting elements) 20 (here, eight LEDs) are connected in series, by applying a DC voltage to the load 2. In the following description, four LEDs 20 disposed at the high potential side in the load 2 are referred to as a "first light source unit 21", and four LEDs 20 disposed at the low potential side are referred to as the "second light source unit 22". However, the number of LEDs 20 in each of the first and second light source units 21 and 22 is not limited to four. That is, each light source unit may include at least one LED 20.

It is assumed that the lighting device 1 according to the present embodiment is installed to a vehicle as an automobile. Among the LEDs 20 constituting the load 2, the first light source unit 21 is used as a passing light (a low-beam). In addition, the first and second light source units 21 and 22 are used as a running light (a high-beam). In this case, for example, a voltage of 2[V] to 4[V] is applied across each LED 20. In the example of FIG. 1, because the load 2 includes eight LEDs 20, a voltage of 16[V] to 32[V] is applied across the load 2, upon the high-beam.

The lighting device 1 further includes the power converter 3 that is a flyback type DC/DC converter. The power converter 3 is connected to the battery 8 (see FIG. 13) that is a DC power supply, and is configured to boost or reduce a DC power supply voltage applied by the battery 8 to a DC voltage capable of lighting the load 2, and output the boosted or reduced DC voltage. The power converter 3 may be a DC/DC converter other than the flyback type. In addition, the power converter 3 may be connected to an AC/DC converter (not shown), which is configured to convert, to a DC voltage, an AC voltage received from an AC power supply (not shown) and output the DC voltage, instead of the battery 8.

Figure 13:
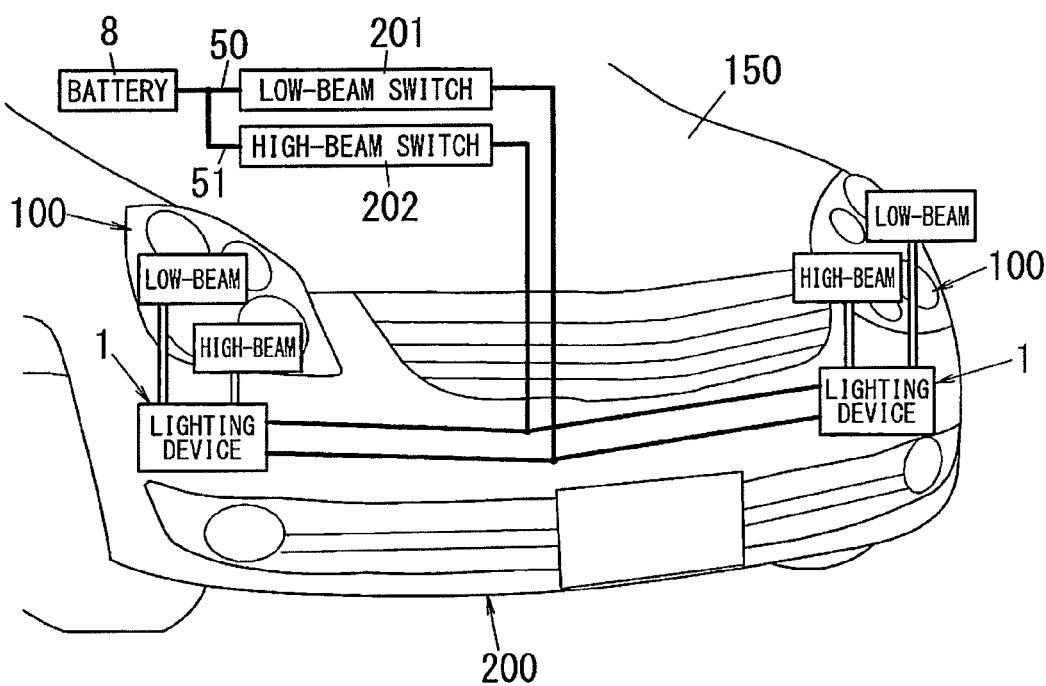
FIG. 13 is a schematic diagram illustrating a vehicle according to an Embodiment.

The power converter 3 is configured to receive the first power supply voltage from the battery 8 in linkage with on/off of a low-beam switch 201 (see FIG. 13). That is, when the low-beam switch 201 is switched on, the power converter 3 receives the first power supply voltage from the battery 8. On the other hand, when the low-beam switch 201 is switched off, the supply of the first power supply voltage from the battery 8 to the power converter 3 is stopped.

The second light source unit 22 is connected in parallel with the second switching element Q2 (the bypass unit) that is an N-channel type MOSFET. The second switching element Q2 is configured to switch on/off, when receiving a switching signal from a switching part 44 described later. In the on-state of the second switching element Q2 (that is, in the first state), the second light source unit 22 is short-circuited, and only the first light source unit 21 is lighted (low-beam). In the off-state of the second switching element Q2 (that is, in the second state), both of the first and second light source units 21 and 22 are lighted (high-beam).

The power converter 3 includes a transformer T1, a first switching element Q1 which is connected in series with a primary winding of the transformer T1, and a capacitor C1 which is connected with a secondary winding of the transformer T1 via a diode D1. A series circuit composed of the primary winding of the transformer T1 and the first switching element Q1 is connected to the battery 8. Therefore, current flows from the secondary winding of the transformer T1 to the capacitor C1 through the diode D1, depending on on/off switching of the first switching element Q1, and accordingly, a DC voltage is generated across the capacitor C1.

Hereinafter, operation of the power converter 3 will be described. When the first switching element Q1 is switched on, current flows through the primary winding of the transformer T1, and accordingly energy is stored in the primary winding. Consequently, a voltage between a drain and source of the first switching element Q1 rises. Here, the power converter 3 further includes a primary-current-measuring part 30 that is configured to measure a primary current flowing through the primary winding of the transformer T1. The primary-current-measuring part 30 is configured to output, to a comparator 10, a voltage that is proportional to the voltage between the drain and source of the first switching element Q1.

The comparator 10 is configured to compare an output value of the primary-current-measuring part 30 with a control value that is output by a comparison calculating part 43 of the microcomputer 4 described later. An output of the comparator 10 is input to a reset (R) of an RS flip-flop circuit 11. When the output value of the primary-current-measuring part 30 exceeds the control value output by the comparison calculating part 43, "1" is input to the reset (R) of an RS flip-flop circuit 11, and accordingly, an output of the RS flip-flop circuit 11 becomes "0" and the first switching element Q1 is switched off.

When the first switching element Q1 is switched off, the energy stored in the primary winding of the transformer T1 is discharged to the secondary side. Then, when the discharge of the energy is completed, the voltage between the drain and source of the first switching element Q1 falls. The falling of the voltage between the drain and source is detected by a differentiation circuit 12. Then, "1" is input to a set (S) of the RS flip-flop circuit 11 due to an output of the differentiation circuit 12. Therefore, the output of the RS flip-flop circuit 11 becomes "1" and the first switching element Q1 is switched on again. In this way, the power converter 3 is controlled by a Boundary Current Mode.

The lighting device 1 is normally configured to light the load 2 by constant current control for controlling a current flowing through the load 2 to a constant level. The control is performed with the microcomputer 4 (controller). Further, the lighting device 1 includes a voltage-measuring circuit 13 and a current-measuring circuit 14. The voltage-measuring circuit 13 is configured to measure, as an output voltage, a voltage applied to the load 2. The current-measuring circuit 14 is configured to measure, as an output current, a current flowing through the load 2. The voltage-measuring circuit 13 is configured to measure the output voltage based on a voltage divided by resistors R1 and R2, which are connected in series across output ends of the power converter 3. The current-measuring circuit 14 is configured to measure the output current based on a voltage across both ends of a resistor R3 which is inserted between the power converter 3 and load 2.

The microcomputer 4 further includes: a first averaging part 40 configured to average the output voltage obtained by the voltage-measuring circuit 13; a second averaging part 41 configured to average the output current obtained by the current-measuring circuit 14; and a current command part 42. The microcomputer 4 is configured to read out a current command value that is previously stored in an internal ROM (not shown) and output the current command value to the current command part 42. The current command part 42 is configured to correct the current command value so as to agree with a value based on a power supply voltage that is measured by a first-power-supply-measuring circuit 15, an ambient temperature of the load 2 that is measured by a first-temperature-measuring unit 5, and an ambient temperature of the microcomputer 4 that is measured by a second-temperature-measuring unit 6.

Here, the first-power-supply-measuring circuit 15 is connected to the battery 8, and configured to measure the DC voltage of the battery 8. The first-temperature-measuring unit 5 includes a thermo-sensitive element, such as a thermistor, and is disposed near the load 2 to measure the ambient temperature of the load 2. The second-temperature-measuring unit 6 includes a thermo-sensitive element, such as a thermistor, and is disposed near the power converter 3 to measure the ambient temperature of the power converter 3.

Then, the microcomputer 4 compares the corrected current command value with an average value of the output current, through the comparison calculating part 43. Then, the microcomputer 4 outputs the control value to the comparator 10 to control the power converter 3 so that the average value agrees with the corrected current command value. Accordingly, the power converter 3 is subjected to the constant current control so that the output current agrees with the constant current command value.

Although not shown, the microcomputer 4 has a function of averaging the power supply voltage obtained by the first-power-supply-measuring circuit 15, a function of averaging the temperature obtained by the first-temperature-measuring unit 5, and a function of averaging the temperature obtained by the second-temperature-measuring unit 6. The microcomputer 4 operates by receiving an operation voltage from a power-supply-generating unit 17. The power-supply-generating unit 17 is connected to the battery 8 and is configured to generate the operation voltage for the microcomputer 4 with the DC voltage supplied from the battery 8.

The microcomputer 4 further includes the switching part 44 that is configured to switch a state where only the first light source unit 21 is lighted and a state where both of the first and second light source units 21 and 22 are lighted, by switching on/off of the second switching element Q2 according to the switching signal. The switching part 44 is configured to output the switching signal based on the second power supply voltage measured by a second-power-supply-measuring circuit 16 that is connected to the battery 8. The second-power-supply-measuring circuit 16 is configured to measure the second power supply voltage supplied from the battery 8 in linkage with on/off of a high-beam switch 202 (see FIG. 13).

Accordingly, when the high-beam switch 202 is switched on, the second switching element Q2 is switched off through the switching signal and both of the first and second light source units 21 and 22 are lighted as the high-beam. On the other hand, when the high-beam switch 202 is switched off, the second switching element Q2 is switched on through the switching signal and only the first light source unit 21 is lighted as the low-beam.

Although the first and second paths 50 and 51 are different from each other, the "first power supply voltage" input to the power converter 3 and the "second power supply voltage" input to the second-power-supply-measuring circuit 16 are supplied from the same battery 8. Accordingly, both of the "first power supply voltage" and "second power supply voltage" indicate the power supply voltage of the battery 8.

Here, when the load 2 is used as a headlight, the on-vehicle battery 8 is used as a DC power supply. A conventional lighting device is configured to light a high-beam, when a power supply voltage of a battery exceeds a reference voltage of 12[V] upon a high-beam switch being switched on. This depends on the power supply voltage of the battery being normally about 14[V] in a state where an engine of a vehicle is under operation.

As described in the background art of the present application, the power supply voltage of the battery fluctuates depending on deterioration of the battery due to the life thereof, or an increase of consumed current. In order to solve this issue, the conventional lighting device is configured to start operation of a DC/DC converter (power converter), when the power supply voltage of the battery exceeds a starting voltage of 9[V] upon a low-beam switch being switched on. In addition, the conventional lighting device is configured to stop the operation of the power converter when the power supply voltage of the battery is below a maintaining voltage of 6[V]

Here, FIG. 3B shows, as a comparison example, an operation state of the power converter and a lighting state of the high-beam, when the power supply voltage of the battery fluctuates in a state where both of the low-beam switch and the high-beam switch are switched on. As shown in FIG. 3B, when the power supply voltage of the battery is in a range of 9[V] to 12[V], there is a problem that only the low-beam is lighted without the high-beam being lighted, regardless of the on-state of the high-beam switch. Further, when the power supply voltage of the battery fluctuates at near the reference voltage (12V), there is a problem that the low-beam and the high-beam are switched repeatedly. That is, in the lighting device as the comparison example, when the power supply voltage of the battery fluctuates, there is a possibility that it is impossible to normally perform switching of the low-beam lamp and the high-beam lamp, namely, switching of the lighting states of the load.

In order to solve this issue, the microcomputer 4 of the lighting device 1 according to the present embodiment is configured to perform a first control of starting operation of the power converter 3, when a first power supply voltage exceeds a starting voltage; and stopping the operation of the power converter 3, when the first power supply voltage is below a maintaining voltage. Further, the microcomputer 4 is configured to perform a second control of switching off the second switching element Q2, when a second power supply voltage exceeds a first threshold voltage; and maintaining an off-state of the second switching element Q2 until the second power supply voltage is below a second threshold voltage.

Hereinafter, the lighting control flows of the microcomputer 4 are described with reference to FIG. 2. First, when the power supply is switched on and the microcomputer 4 is reset (F01), the microcomputer 4 performs an initialization processing for variables, flags or the like to be used (F02). Next, the microcomputer 4 determines whether or not the low-beam switch 201 is switched on (F03). When determining that the low-beam switch 201 is switched on, the microcomputer 4 acquires the first power supply voltage through A/D conversion, and determines whether or not the first power supply voltage exceeds the starting voltage that is read out from the internal ROM (not shown) (F04). Then, when determining that the first power supply voltage exceeds the starting voltage, the microcomputer 4 starts the operation of the power converter 3, and the processing is shifted to the control (after F05) for lighting the load 2. Regarding F03, specifically, the microcomputer 4 is activated by switching the low-beam switch 201 on, and is configured to compare a voltage measured through the first-power-supply-measuring circuit 15 with a threshold voltage higher than a minimum operating voltage of the microcomputer 4. The microcomputer 4 is also configured to determine that the low-beam switch 201 is switched on if the voltage measured through the first-power-supply-measuring circuit 15 is higher than the threshold voltage.

The microcomputer 4, for lighting the load 2, acquires the power supply voltage through A/D conversion (F05), and adds the power supply voltage to measured values that were acquired in the past, and performs averaging of the power supply voltages (F06). As one example, the microcomputer 4 always stores three values, as the latest measured values (update when acquiring), and when acquiring a new measured value, adds the new measured value to the three values, and performs the averaging by dividing the total by four.

Next, the microcomputer 4 acquires the output voltage of the power converter 3 through A/D conversion (F07), and adds the output voltage to measured values that were acquired in the past, and performs averaging of the output voltages (F08). Then, the microcomputer 4 acquires a driver temperature (an ambient temperature of the power converter 3) through A/D conversion (F09), and adds the driver temperature to measured values that were acquired in the past, and performs averaging of the driver temperatures (F10). Then, the microcomputer 4 acquires an LED temperature (an ambient temperature of the load 2) through A/D conversion (F11), and adds the LED temperature to measured values that were acquired in the past, and performs averaging of the LED temperatures (F12).

Then, the microcomputer 4 reads out the current command value stored in the internal ROM (not shown), and corrects the current command value so as to agree with a value based on an average value of the power supply voltages, an average value of the driver temperatures and an average value of the LED temperatures (F13). Further, the microcomputer 4 acquires the output current of the power converter 3 through A/D conversion (F14), and adds the output current to measured values that were acquired in the past, and performs averaging of the output currents (F15). Then, the microcomputer 4 compares the corrected current command value with an average value of the output currents (F16), and modifies the control value based on the comparison result (F17).

Then, the microcomputer 4 determines whether or not the first power supply voltage acquired through A/D conversion is below the maintaining voltage read out from the internal ROM (F18). Then, when determining that the first power supply voltage is below the maintaining voltage, the microcomputer 4 stops the operation of the power converter 3. On the other hand, when the microcomputer 4 determines that the first power supply voltage is not below the maintaining voltage, the processing is shifted to the control (after F19) for the high-beam.

Next, the microcomputer 4 acquires the second power supply voltage through A/D conversion (F19). As shown in FIG. 1B, when the second power supply voltage exceeds the first threshold voltage that is read out from the internal ROM, the microcomputer 4 outputs the switching signal for switching off the second switching element Q2 (F20). Further, as shown in FIG. 1B, when the second power supply voltage is below the second threshold voltage that is read out from the internal ROM in the off-state of the second switching element Q2, the microcomputer 4 outputs the switching signal for switching on the second switching element Q2 (F20). Then, the microcomputer 4 performs other control, such as control for determining abnormality in the load 2 or abnormality in the power supply (F21).

In the lighting control flows of the microcomputer 4 described above, the flows of "F04" and "F18" corresponds to the "first control", and the flows of "F19" and "F20" corresponds to the "second control".

Here, FIG. 3A shows, in the lighting device 1, an operation state of the power converter 3 and a lighting state of the high-beam, when the power supply voltage of the battery 8 fluctuates in a state where both of the low-beam switch 201 and the high-beam switch 202 are switched on. In the lighting device 1 according to the present embodiment, the internal ROM of the microcomputer 4 stores information that the starting voltage, the maintaining voltage, the first threshold voltage and the second threshold voltage are defined as 9[V], 6[V], 7.5[V] and 4[V], respectively.

As shown in FIG. 3A, because the first threshold voltage (7.5[V]) is set to be lower than the starting voltage (9[V]), the power converter 3 is already in an operated state when the high-beam switch 202 is switched on. For this reason, unlike the conventional lighting device, the lighting device 1 according to the present embodiment can prevent a situation where the high-beam is not lighted, in spite of the on-state of the high-beam switch 202. In addition, because the second threshold voltage (4[V]) is set to be lower than the first threshold voltage (7.5[V]), it is possible to maintain the lighting state of the high-beam, even when the power supply voltage of the battery 8 fluctuates at near the first threshold voltage.

As described above, in the lighting device 1 according to the present embodiment, as a condition of switching on/off of the second switching element Q2 (the bypass unit) (switching to the first state or the second state), the microcomputer 4 (the controller) is configured to have hysteresis characteristics with the first threshold voltage and the second threshold voltage to be compared with the second power supply voltage. Further, in the lighting device 1 according to the present embodiment, as a condition of starting the operation of the power converter 3, the starting voltage to be compared with the first power supply voltage is set to be lower than the first threshold voltage. Therefore, in the lighting device 1 according to the present embodiment, it is possible to normally switch the low-beam and the high-beam, namely, the lighting states of the load 2, even when the power supply voltage of the battery 8 fluctuates.

Regarding the power supply voltage of the on-vehicle battery, it is generally known that a peak voltage thereof fluctuates in a range of 2 to 3[V] due to peripheral apparatuses. For this reason, as the lighting device 1 according to the present embodiment, it is preferred that each threshold voltage is set so that a difference between the first threshold voltage (7.5 [V]) and the second threshold voltage (4[V]) exceeds the range of 2 to 3[V].

As the lighting device 1 according to the present embodiment, it is preferred that the maintaining voltage (6[V]) is set to be higher than the second threshold voltage (4[V]). By setting the maintaining voltage in this way, as shown in FIG. 3A, it is possible to maintain the lighting state of the high-beam until the power supply voltage of the battery 8 is below the maintaining voltage and the operation of the power converter 3 is stopped.

(Second Embodiment)

Figure 4:
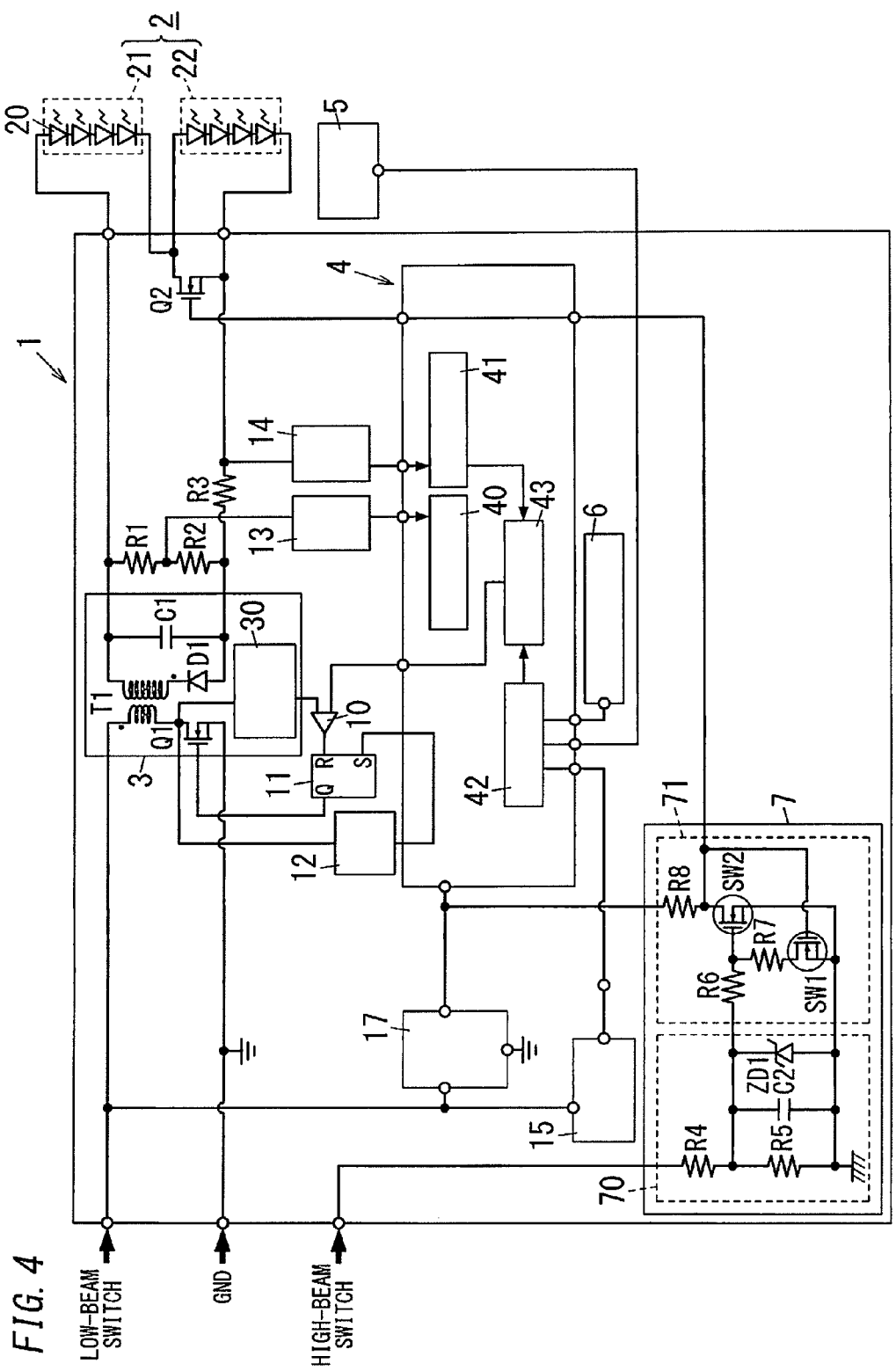
FIG. 4 is a circuit schematic diagram illustrating a lighting device according to Second Embodiment.

Hereinafter, a lighting device 1 according to the present embodiment will be described with reference to drawings. Because a basic configuration of the lighting device 1 according to the present embodiment is similar to that of the lighting device 1 according to the First Embodiment, components similar to the First Embodiment are assigned with same reference numerals, and explanations thereof will be appropriately omitted. As shown in FIG. 4, in the lighting device 1 according to the present embodiment, a controller includes a microcomputer 4 that is configured to perform the first control, and a switching circuit 7 that is configured to perform the second control.

The switching circuit 7 includes a detecting circuit 70 that is configured to detect the second power supply voltage, and a Schmidt trigger circuit 71 that is configured to have hysteresis characteristics with the first threshold voltage and the second threshold voltage. The detecting circuit 70 includes a series circuit composed of resistors R4 and R5, and divides the second power supply voltage with the series circuit, and detects a divided voltage. Each of a capacitor C2 (for stabilizing the divided voltage) and a Zener diode ZD1 (for absorbing a surge superposed on the second power supply voltage) is connected in parallel with the resistor R5.

The Schmidt trigger circuit 71 includes resistors R6 to R8, and two switch element SW1 and SW2, each of which is an N-channel type MOSFET. A voltage that is divided with the resistors R6 and R7 and the switch element SW1 is input to a gate terminal of the switch element SW2. A power-supply-generating unit 17 supplies a constant voltage to a drain terminal of the switch element SW2 through the resistor R8. Further, an output voltage of the Schmidt trigger circuit 71 (a voltage obtained by dividing the constant voltage supplied from the power-supply-generating unit 17 with the resistor R8 and the switch element SW2) is input to a gate terminal of the switch element SW1.

Figure 5:
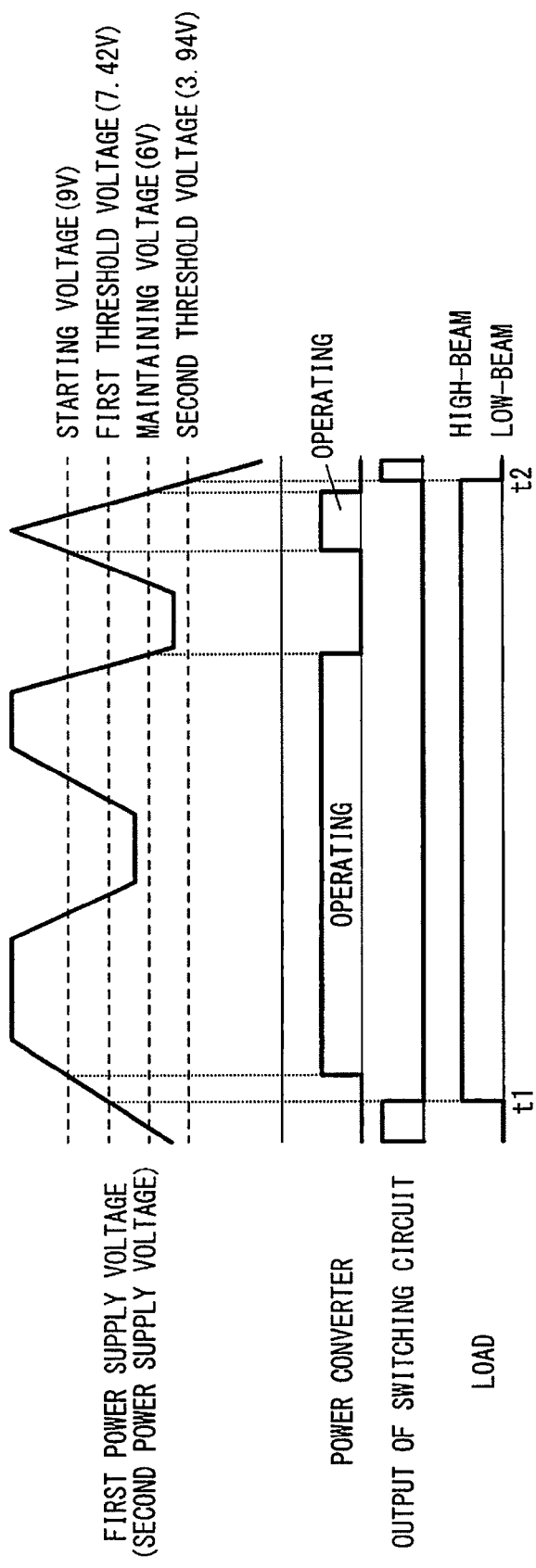
FIG. 5 is a time chart illustrating operation of the lighting device according to the Second Embodiment.

Hereinafter, operation of the switching circuit 7 will be described with reference to FIG. 5. In the lighting device 1 according to the present embodiment, a gate threshold voltage of the switch element SW2 is 1.0[V], and resistance values of resistors R4 to R7 are 15 [kΩ], 5.1 [kΩ], 5.1 [kΩ] and 10 [kΩ], respectively.

The switch element SW2 is in an off-state before a time t1, and accordingly, the power-supply-generating unit 17 outputs the constant voltage to the gate terminal of the switch element SW1 through the resistor R8. Therefore, the switch element SW1 is switched on, and then a voltage obtained by dividing the second power supply voltage with resistors R4 to R7 is input to the gate terminal of the switch element SW2.

When the second power supply voltage exceeds 7.42[V] (the first threshold voltage) at the time t1, the switch element SW2 is switched on, and then an output of the Schmidt trigger circuit 71 becomes equal to a ground potential (a GND level). Therefore, the second switching element Q2 is switched off, and the switch element SW1 is switched off. Accordingly, after the time t1, a voltage obtained by dividing the second power supply voltage with resistors R4 and R5 is input to the gate terminal of the switch element SW2.

Then, when the second power supply voltage is below 3.94[V] (the second threshold voltage) at a time t2, the switch element SW2 is switched off, and the output of the Schmidt trigger circuit 71 becomes equal to the constant voltage supplied from the power-supply-generating unit 17. Therefore, the second switching element Q2 is switched on, and the switch element SW1 is switched on.

That is, the lighting device 1 according to the present embodiment is configured to perform, with the switching circuit 7 instead of the microcomputer 4, the second control in the lighting device 1 according to the First Embodiment, and it is possible to provide the same effect as in the First Embodiment.

(Third Embodiment)

Hereinafter, a lighting device 1 according to the present embodiment will be described with reference to drawings. Because a basic configuration of the lighting device 1 according to the present embodiment is similar to that of the lighting device 1 according to the Second Embodiment, components similar to the Second Embodiment are assigned with same reference numerals, and explanations thereof will be appropriately omitted. The lighting device 1 according to the present embodiment is characterized in that a controller is configured to measure a load voltage of a second light source unit 22 (at least one LED 20, as part of a load 2), and determine that abnormality occurs when the load voltage satisfies a prescribed condition, and then switch on a second switching element Q2 (a bypass unit) (switch to the first state where the second light source unit 22 is short-circuited).

Figure 6:
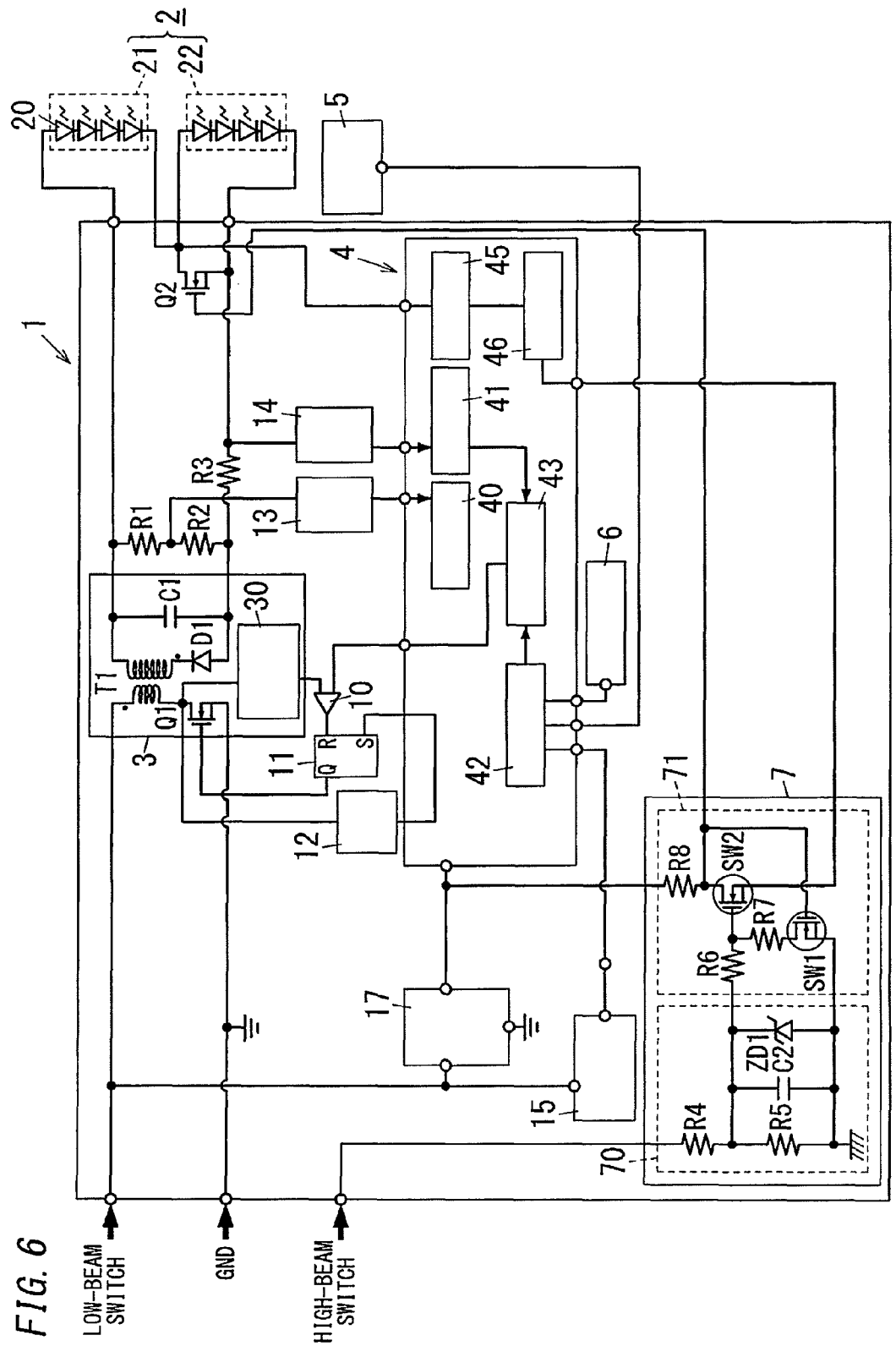
FIG. 6 is a circuit schematic diagram illustrating a lighting device according to Third Embodiment.

As shown in FIG. 6, in the lighting device 1 according to the present embodiment, the microcomputer 4 further includes a third averaging part 45 that is configured to average a load voltage to be applied to the second light source unit 22, and an abnormality determining part 46 that is configured to determine whether or not abnormality occurs in the second light source unit 22 based on the load voltage. An output terminal of the microcomputer 4 is connected to a source terminal of a switch element SW2 in a switching circuit 7, and accordingly, the source potential is controlled by the microcomputer 4.

Hereinafter, the lighting control flows of the microcomputer 4 will be described with reference to FIG. 7. The lighting control flows similar to those of the microcomputer 4 of the First Embodiment are assigned with same flow numerals, and explanations thereof will be appropriately omitted. In the lighting device 1 according to the present embodiment, the switching circuit 7 performs the second control, and accordingly, the microcomputer 4 does not perform flows of F19 and F20.

Figure 7:
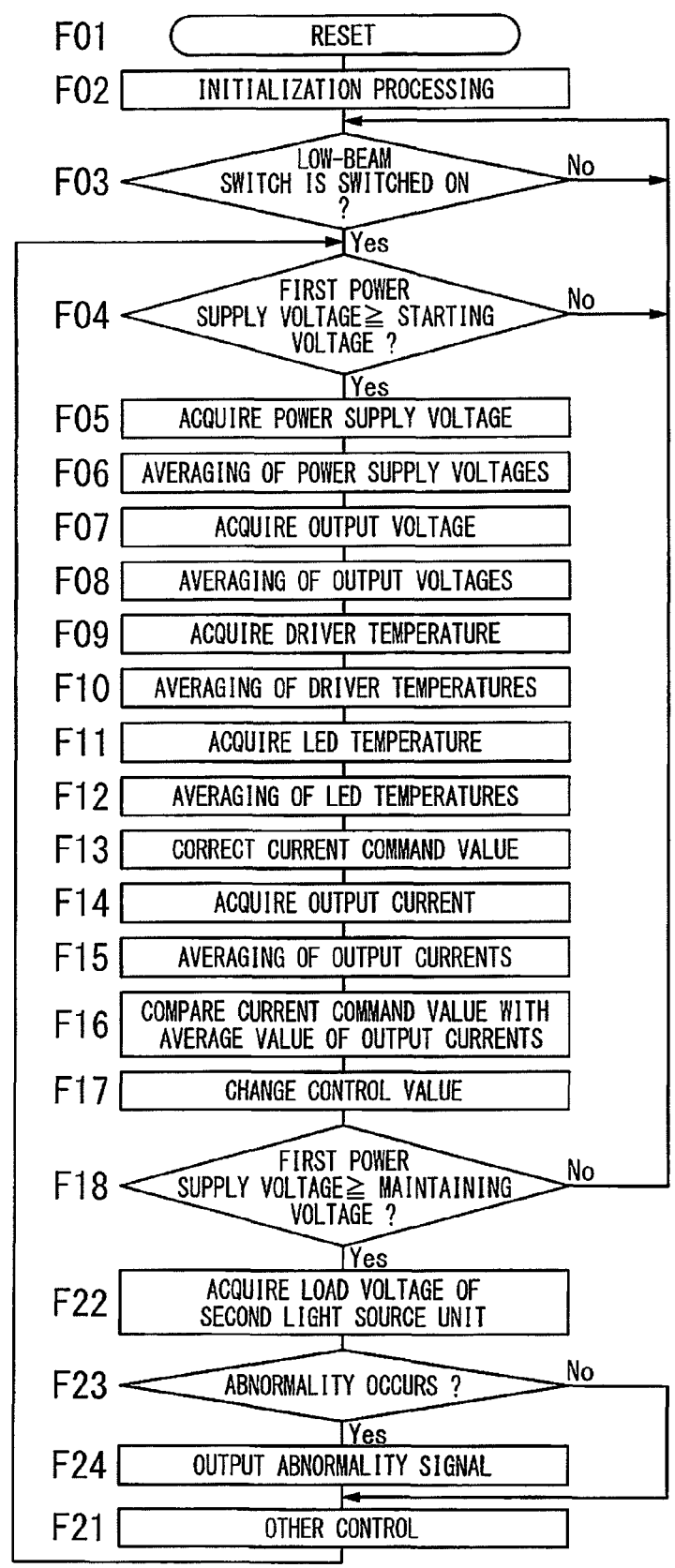
FIG. 7 is a flow chart for lighting control of a microcomputer in the lighting device according to the Third Embodiment.

As shown in FIG. 7, after a flow of F18, the microcomputer 4 acquires the load voltage of the second light source unit 22 through A/D conversion (F22). At this time, the microcomputer 4 adds the load voltage to measured values that were acquired in the past, and performs averaging of the load voltages. Then, the microcomputer 4 compares the acquired load voltage with a voltage determination value that is read out from the internal ROM, and determines whether or not abnormality occurs in the second light source unit 22 (F23). In this case, for example, any of the following conditions is set for determining the "abnormality": a condition that a state where the load voltage is lower than the voltage determination value is continuously kept during a prescribed time period; and a condition that a state where the load voltage is higher than the voltage determination value is continuously kept during a prescribed time period.

When determining that the abnormality occurs in the second light source unit 22, the microcomputer 4 outputs an abnormality signal with a high level to the source terminal of the switch element SW2 in the switching circuit 7. In a normal state where the abnormality does not occur in the second light source unit 22, a voltage level across the source terminal of the switch element SW2 is at a low level. A source voltage and a drain voltage of the switch element SW2 are increased, due to the abnormality signal, to a voltage corresponding to a constant voltage that is supplied from a power-supply-generating unit 17. Accordingly, it is possible to forcibly switch on the second switching element Q2.

Figure 8:
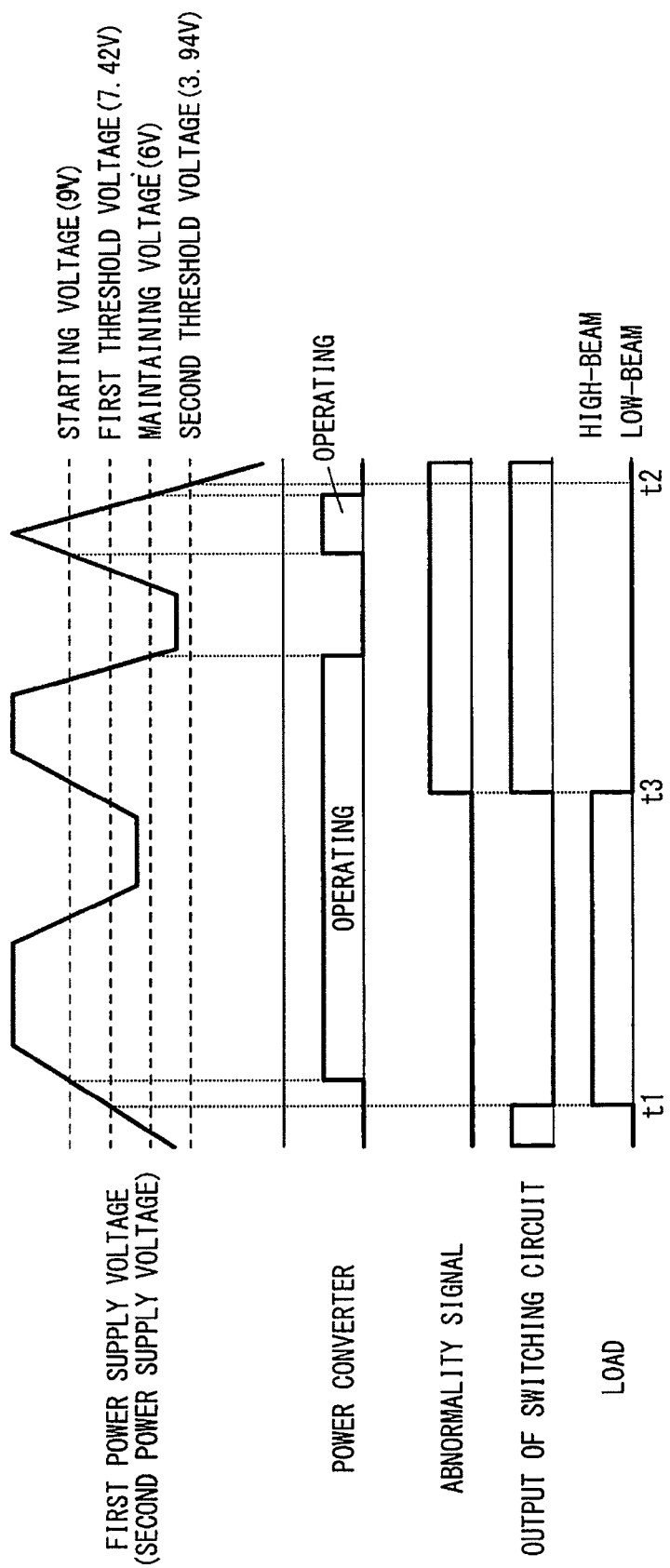
FIG. 8 is a time chart illustrating operation of the lighting device according to the Third Embodiment.

As shown in FIG. 8, when the microcomputer 4 determines that the abnormality occurs at a time t3 (t1<t3<t2), the low-beam is lighted even when the high-beam switch 202 is switched on after the time t3. That is, in the lighting device 1 according to the present embodiment, when occurrence of abnormality is determined at any LED 20 in the second light source unit 22, the second switching element Q2 (a bypass unit) is forcibly switched on (that is, short-circuiting is performed) to light the low-beam. Therefore, it is possible to secure a certain degree of visibility of a driver.

The lighting device 1 according to the present embodiment is configured so that the second light source unit 22 at the low potential side is short-circuited by the second switching element Q2. However, the lighting device 1 may be configured so that the first light source unit 21 at the high potential side is short-circuited by the second switching element Q2. In this case, a load voltage of the first light source unit 21 may be measured by the microcomputer 4.

In the lighting device 1 according to the present embodiment, the first control is performed by the microcomputer 4, and the second control is performed by the switching circuit 7. However, other configuration may be adopted. For example, similarly to the lighting device 1 according to the First Embodiment, the lighting device 1 may be configured so that both of the first and second controls are performed by only the microcomputer 4.

(Fourth Embodiment)

Hereinafter, a lighting device 1 according to the present embodiment will be described with reference to drawings. Because a basic configuration of the lighting device 1 according to the present embodiment is similar to that of the lighting device 1 according to the Third Embodiment, components similar to the Third Embodiment are assigned with same reference numerals, and explanations thereof will be appropriately omitted. The lighting device 1 according to the present embodiment is characterized in that a microcomputer 4 (a controller) is configured to switch on a second switching element Q2 (a bypass unit) (switch to the first state where a second light source unit 22 is short-circuited), when a state where the second power supply voltage is lower than the second threshold voltage is continuously kept during a prescribed time period.

Figure 9:
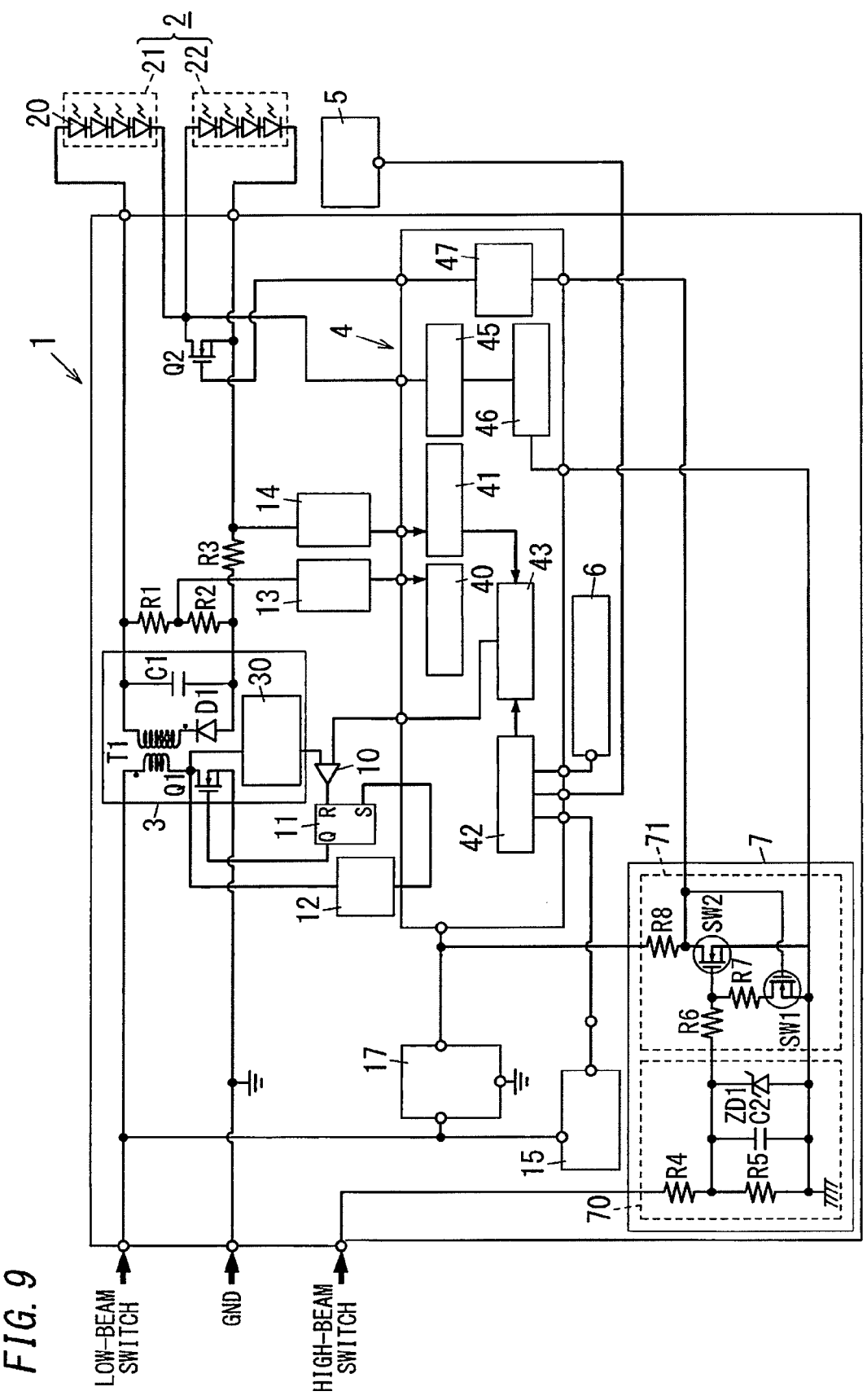
FIG. 9 is a circuit schematic diagram illustrating a lighting device according to Fourth Embodiment.

As shown in FIG. 9, in the lighting device 1 according to the present embodiment, the microcomputer 4 further includes a switching determination part 47 that is configured to determine whether or not on/off of the second switching element Q2 should be switched based on an output voltage of a switching circuit 7.

Hereinafter, the lighting control flows of the microcomputer 4 will be described with reference to FIG. 10. The lighting control flows similar to those of the microcomputer 4 of the Third Embodiment are assigned with same flow numerals, and explanations thereof will be appropriately omitted. In the lighting device 1 according to the present embodiment, both the switching circuit 7 and the microcomputer 4 perform the second control, and accordingly, the microcomputer 4 does not perform flows of F19 and F20.

Figure 10:
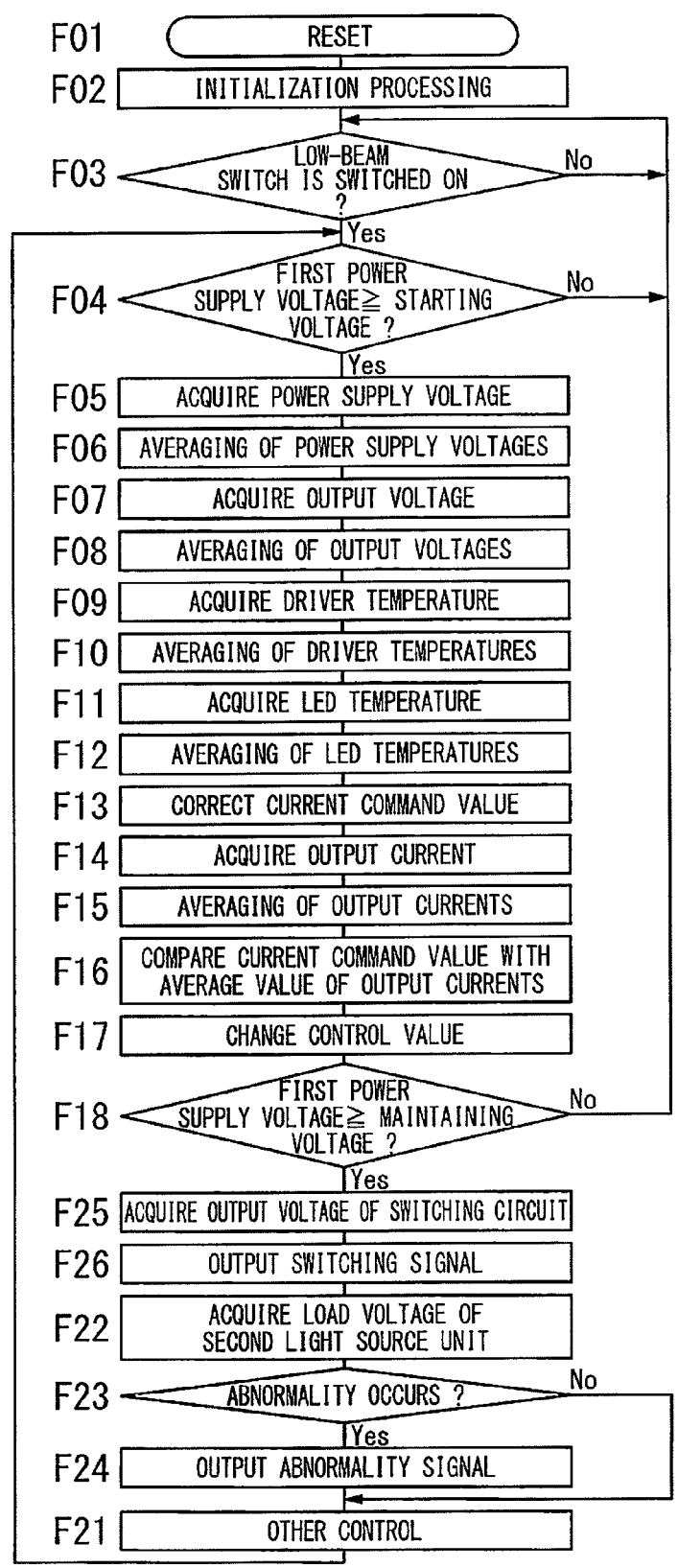
FIG. 10 is a flow chart for lighting control of a microcomputer in the lighting device according to the Fourth Embodiment.

As shown in FIG. 10, after a flow of F18, the microcomputer 4 acquires the output voltage of the switching circuit 7 through A/D conversion (F25). When the acquired output voltage is switched from a high level to a low level (the second power supply voltage exceeds the first threshold voltage), the microcomputer 4 outputs a switching signal for switching off the second switching element Q2 (F26). When the acquired output voltage is switched from the low level to the high level (the second power supply voltage is below the second threshold voltage), the microcomputer 4 determines whether or not a high-level state of the output voltage is continuously kept during a prescribed time period. Then, when determining that the high-level state is continuously kept during the prescribed time period, the microcomputer 4 outputs the switching signal for switching on the second switching element Q2 (F26). On the other hand, when determining that the high-level state is not continuously kept during the prescribed time period, the microcomputer 4 outputs no switching signal.

Figure 11:
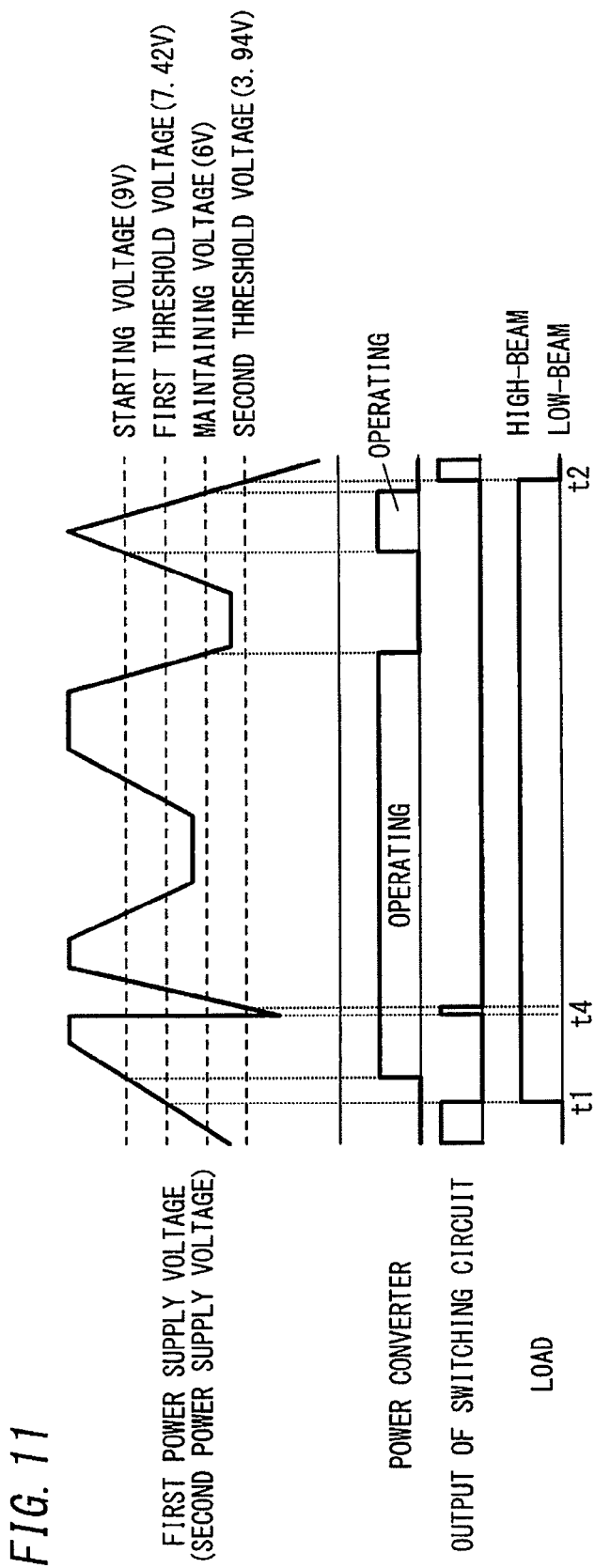
FIG. 11 is a time chart illustrating operation of the lighting device according to the Fourth Embodiment.

For example, when the amount of electric power consumed in peripheral apparatuses is suddenly increased in a state of lighting the high-beam, there is a case where a power supply voltage (second power supply voltage) of a battery 8 is suddenly reduced. Such a reduction in the power supply voltage of the battery 8 is only temporary (for example, for several hundred milliseconds). For this reason, when the light is switched from the high-beam to the low-beam depending on the power supply voltage of the battery 8 being reduced temporarily, a driver may mistakenly feel occurrence of abnormality and it is undesirable. In order to solve this issue, in the lighting device 1 according to the present embodiment, as shown in FIG. 11, when the second power supply voltage is below the second threshold voltage at a time t4 (t1<t4<t2) temporarily, the microcomputer 4 maintains the lighting state of the high-beam without switching to the low-beam. Therefore, in the lighting device 1 according to the present embodiment, even when the power supply voltage of the battery 8 is reduced temporarily, the light is not switched from the high-beam to the low-beam, and accordingly, it is possible to prevent the driver from mistakenly feeling occurrence of abnormality.

In the lighting device 1 according to the present embodiment, the first control is performed by the microcomputer 4, and the second control is performed by both of the microcomputer 4 and the switching circuit 7. However, other configuration may be adopted. For example, similarly to the lighting device 1 according to the First Embodiment, the lighting device 1 may be configured so that both of the first and second controls are performed by only the microcomputer 4.

Figure 12:
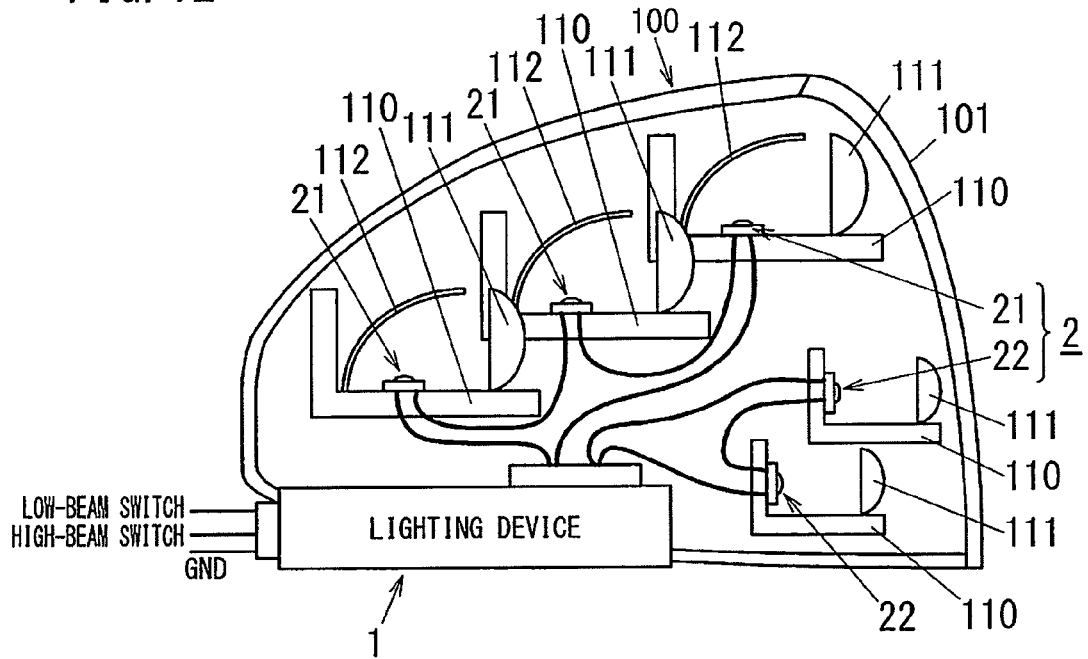
FIG. 12 is a schematic diagram illustrating a headlight apparatus according to an Embodiment.

Hereinafter, a headlight apparatus 100 according to an Embodiment will be described with reference to FIG. 12. As shown in FIG. 12, the headlight apparatus 100 according to this Embodiment includes: the lighting device 1 according to any one of the First to Fourth Embodiments; a load 2 (in FIG. 12, the load 2 is configured by three first light source units 21 connected in series and two second light source units 22 connected in series); and a housing 101 that houses the load 2. Each of the first and second light source units 21 and 22 is installed at a lamp body 110. Each of lamp bodies 110, at which the first light source units 21 are installed, is provided with a lens 111 and a reflecting plate 112. Each of lamp bodies 110, at which the second light source units 22 are installed, is provided with a lens 111.

Hereinafter, a vehicle 200 according to an Embodiment will be described with reference to FIG. 13. As shown in FIG. 13, the vehicle 200 according to this Embodiment includes: a pair of headlight apparatuses 100; and a vehicle body 150 to which the headlight apparatuses 100 are installed. A lighting device 1 of each headlight apparatus 100 is connected to a low-beam switch 201 and a high-beam switch 202 which are disposed near a driver's seat in the vehicle 200. Accordingly, a low-beam (first light source units 21 in each headlight apparatus 100) is lighted by switching on the low-beam switch 201. Further, a high-beam (first light source units 21 and second light source units 22 in each headlight apparatus 100) is lighted by switching on the high-beam switch 202.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A lighting device, comprising:
a power converter configured to convert a first power supply voltage that is received from a DC power supply through a first path, and supply an output obtained by the conversion to a load in which a plurality of light emitting elements are connected in series;
a bypass unit configured to short-circuit at least one light emitting element of the plurality of light emitting elements, as part of the load; and
a controller configured to control the power converter, the controller being configured to control switching a first state where the at least one light emitting element is short-circuited by the bypass unit, and a second state where the short-circuiting is opened,
the controller being configured to perform a first control and a second control,
the first control being of:
starting operation of the power converter, when the first power supply voltage exceeds a starting voltage; and
stopping the operation of the power converter, when the first power supply voltage is below a maintaining voltage that is lower than the starting voltage,
the second control being of:
switching to the second state, when a second power supply voltage exceeds a first threshold voltage that is lower than the starting voltage, the second power supply voltage being input from the DC power supply through a second path different from the first path;
maintaining the second state until the second power supply voltage is below a second threshold voltage that is lower than the first threshold voltage; and
switching to the first state, when the second power supply voltage is below the second threshold voltage.

2. The lighting device according to claim 1, wherein the maintaining voltage is set to be higher than the second threshold voltage.

3. The lighting device according to claim 1, wherein the controller comprises a microcomputer that is configured to perform the first control, and a switching circuit that is configured to perform the second control, and
wherein the switching circuit comprises a detecting circuit that is configured to detect the second power supply voltage, and a Schmidt trigger circuit that is configured to have hysteresis characteristics with the first threshold voltage and the second threshold voltage.

4. The lighting device according to claim 2, wherein the controller comprises a microcomputer that is configured to perform the first control, and a switching circuit that is configured to perform the second control, and
wherein the switching circuit comprises a detecting circuit that is configured to detect the second power supply voltage, and a Schmidt trigger circuit that is configured to have hysteresis characteristics with the first threshold voltage and the second threshold voltage.

5. The lighting device according to claim 1, wherein the controller is configured to measure a load voltage of the at least one light emitting element, as the part of the load,
the controller being configured to determine that abnormality occurs when the load voltage satisfies a prescribed condition, and then switch to the first state.

6. The lighting device according to claim 2, wherein the controller is configured to measure a load voltage of the at least one light emitting element, as the part of the load,
the controller being configured to determine that abnormality occurs when the load voltage satisfies a prescribed condition, and then switch to the first state.

7. The lighting device according to claim 3,
wherein the controller is configured to measure a load voltage of the at least one light emitting element, as the part of the load,
the controller being configured to determine that abnormality occurs when the load voltage satisfies a prescribed condition, and then switch to the first state.

8. The lighting device according to claim 4,
wherein the controller is configured to measure a load voltage of the at least one light emitting element, as the part of the load,
the controller being configured to determine that abnormality occurs when the load voltage satisfies a prescribed condition, and then switch to the first state.

9. The lighting device according to claim 1,
wherein the controller is configured to switch to the first state, when a state where the second power supply voltage is lower than the second threshold voltage is continuously kept during a prescribed time period.

10. A headlight apparatus, comprising the lighting device according to claim 1, the load, and a housing that houses the load.

11. A vehicle, comprising the headlight apparatus according to claim 10, and a vehicle body to which the headlight apparatus is installed.

* * * * *